US009251941B2

(12) United States Patent
Shi et al.

(10) Patent No.: US 9,251,941 B2
(45) Date of Patent: Feb. 2, 2016

(54) TRANSFORMER

(71) Applicant: Emerson Network Power, Energy Systems, North America, Inc., Warrenville, IL (US)

(72) Inventors: Yaming Shi, Shenzhen (CN); Yuangang Liu, Shenzhen (CN); Liwei Huang, Shenzhen (CN); Xiangsheng Li, Shenzhen (CN); Feng Xu, Shenzhen (CN)

(73) Assignee: Emerson Network Power, Energy Systems, North America, Inc., Warrenville, IL (US)

( * ) Notice: Subject to any disclaimer, the term of this patent is extended or adjusted under 35 U.S.C. 154(b) by 10 days.

(21) Appl. No.: 14/163,405

(22) Filed: Jan. 24, 2014

(65) Prior Publication Data

US 2014/0266534 A1 Sep. 18, 2014

(30) Foreign Application Priority Data

Mar. 15, 2013 (CN) .......................... 2013 1 0082616

(51) Int. Cl.

*H01F 17/06* (2006.01)
*H01F 27/28* (2006.01)
*H02M 5/06* (2006.01)
*H01F 3/14* (2006.01)
*H01F 27/38* (2006.01)
*H01F 27/34* (2006.01)

(52) U.S. Cl.

CPC .................. *H01F 3/14* (2013.01); *H01F 27/38* (2013.01); *H01F 27/2823* (2013.01); *H01F 2027/348* (2013.01)

(58) Field of Classification Search

CPC ...... H01F 3/14; H01F 38/08; H01F 2027/348
USPC ......... 336/160, 165, 178, 180, 182, 183, 184, 336/212; 363/170, 171, 148, 152
See application file for complete search history.

(56) References Cited

U.S. PATENT DOCUMENTS 1,869,364 A * 8/1932 Allison .................. H01F 29/10 336/133
3,708,744 A * 1/1973 Stephens .................. G05F 3/06 323/307
4,019,122 A * 4/1977 Ryan ......................... G05F 3/06 323/307

(Continued)

FOREIGN PATENT DOCUMENTS

CN 101299369 11/2008

*Primary Examiner* — Alexander Talpalatski
*Assistant Examiner* — Joselito Baisa
(74) *Attorney, Agent, or Firm* — Harness, Dickey & Pierce, P.L.C.

(57) ABSTRACT

There is provided a transformer including an E shaped and two I shaped magnetic cores and a first, second and third windings, wherein: one I shaped magnetic core is located between one side and a middle legs of the E shaped magnetic core, another is located between another side and the middle legs; there is an air gap on each of the two I shaped magnetic cores or two side or bottom legs of the E shaped magnetic core, the first winding is wound on a part of the magnetic cores where the air gap exists; the second and third windings are wound on the middle leg; and the first winding is connected in parallel with the second winding to constitute a primary winding; the third winding is a secondary winding. With the transformer provided by the invention, transformer winding loss can be reduced, and transformer efficiency can be improved.

4 Claims, 10 Drawing Sheets

(56) References Cited

U.S. PATENT DOCUMENTS

| | | | | | |
|---|---|---|---|---|---|
| 4,613,841 | A * | 9/1986 | Roberts | H01F 17/043 | 336/160 |
| 4,675,796 | A | 6/1987 | Gautherin et al. | | |
| 5,335,163 | A * | 8/1994 | Seiersen | H01F 30/10 | 323/362 |
| 5,523,673 | A * | 6/1996 | Ratliff | G05F 1/325 | 323/206 |
| 5,783,984 | A * | 7/1998 | Keuneke | H03H 7/38 | 336/155 |
| 6,320,490 | B1 * | 11/2001 | Clayton | H01F 30/10 | 336/170 |
| 6,348,848 | B1 * | 2/2002 | Herbert | H01F 3/12 | 323/308 |
| 7,136,293 | B2 * | 11/2006 | Petkov | H01F 27/38 | 336/170 |
| 7,332,992 | B2 | 2/2008 | Iwai | | |
| 2011/0043314 | A1 * | 2/2011 | Hogan | H02N 11/008 | 336/178 |
| 2013/0033351 | A1 | 2/2013 | Kim et al. | | |

* cited by examiner

TRANSFORMER

CROSS-REFERENCE TO RELATED APPLICATION

This application claims the benefit and priority of Chinese Application No. 201310082616.3, filed on Mar. 15, 2013, the entire disclosure of which is incorporated herein by reference.

FIELD OF THE INVENTION

The present invention relates to the technical field of power electronics, and in particular to a transformer.

BACKGROUND OF THE INVENTION

A transformer is means for changing an alternating voltage utilizing the principle of electromagnetic induction, and has been widely used in the technical field of power electronics. The structure of a transformer in the prior art is illustrated in FIG. 1. The transformer consists of an E shaped magnetic core, an I shaped magnetic core 12, and a transformer winding 13. Meanwhile, the E shaped magnetic core includes a middle leg 111, two side legs 112, and two bottom legs 113. The transformer winding 13 includes a primary winding and a secondary winding. The transformer winding 13 is wound on the middle leg 111 of the E shaped magnetic core. The middle leg 111 of the E shaped magnetic core is of an air gap. The size of the excitation inductance of the transformer can be adjusted by adjusting the width of the air gap.

However, the excitation inductance of the transformer of such structure is relative small, resulting in a relative large excitation current existed in the primary winding of the transformer. The magnetomotive force generated by the excitation current spans the secondary winding, and induces to generate additional eddy current loss in the secondary winding, thereby reducing transform efficiency of the transformer. And, the value of such additional eddy current loss is generally in proportion to the thickness of a copper foil, and therefore it is impossible to improve the transform efficiency of the transformer by increasing the thickness of the copper foil.

SUMMARY OF THE INVENTION

An embodiment of the invention provides a transformer to reduce transformer winding loss and to improve transformer efficiency.

An embodiment of the invention provides a transformer including an E shaped magnetic core, two I shaped magnetic cores, a first winding, a second winding, and a third winding, wherein:

one of the two I shaped magnetic cores is located between one side leg and a middle leg of the E shaped magnetic core, and constitutes a closed magnetic circuit together with the one side leg, the middle leg, and one bottom leg of the E shaped magnetic core; another of the two I shaped magnetic cores is located between another side leg and the middle leg of the E shaped magnetic core, and constitutes a closed magnetic circuit together with the another side leg, the middle leg, and another bottom leg of the E shaped magnetic core;

there is an air gap on each of the two I shaped magnetic cores, two side legs of the E shaped magnetic core, or two bottom legs of the E shaped magnetic core, the first winding is wound on a part of the two I shaped magnetic cores or the E shaped magnetic core where the air gap exists; the second and third windings are wound on the middle leg of the E shaped magnetic core; and the first winding is connected in parallel with the second winding to constitute a primary winding of the transformer; the third winding is a secondary winding of the transformer.

Another embodiment of the invention provides a transformer including a first E shaped magnetic core, a second E shaped magnetic core, an I shaped magnetic core, a first winding, a second winding, and a third winding, wherein:

an opening of the first E shaped magnetic core faces that of the second E shaped magnetic core, the I shaped magnetic core is located between the first E shaped magnetic core and the second E shaped magnetic core so as to form a tesseral magnetic core;

there is an air gap on a middle leg, each of two bottom legs, or each of two side legs of the first E shaped magnetic core;

the first winding is wound on the first E shaped magnetic core; the second and third windings are wound on a middle leg of the second E shaped magnetic core; and the first winding is connected in parallel with the second winding to constitute a primary winding of the transformer; the third winding is a secondary winding of the transformer.

Another embodiment of the invention provides a transformer including a U shaped magnetic core, an I shaped magnetic core, a first winding, a second winding, and a third winding, wherein:

the I shaped magnetic core is located between two side legs of the U shaped magnetic core, and constitutes a closed magnetic circuit together with the U shaped magnetic core;

there is an air gap on the I shaped magnetic core or a bottom leg of the U shaped magnetic core, the first winding is wound on a part of the I shaped magnetic core or the U shaped magnetic core where the air gap exists; the second and third windings are wound on the two side legs of the U shaped magnetic core; and the first winding is connected in parallel with the second winding to constitute a primary winding of the transformer; the third winding is a secondary winding of the transformer.

Another embodiment of the invention provides a transformer including a first U shaped magnetic core, a second U shaped magnetic core, an I shaped magnetic core, a first winding, a second winding, and a third winding, wherein:

an opening of the first U shaped magnetic core faces that of the second U shaped magnetic core, the I shaped magnetic core is located between the first U shaped magnetic core and the second U shaped magnetic core so as to form a B shaped magnetic core;

there is an air gap on a bottom leg or each of two side legs of the first U shaped magnetic core;

the first winding is wound on the first U shaped magnetic core; the second and third windings are wound on two side legs of the second U shaped magnetic core; and the first winding is connected in parallel with the second winding to constitute a primary winding of the transformer; the third winding is a secondary winding of the transformer.

With the transformer according to the embodiment of the invention, although the first winding is connected in parallel with the second winding, leakage magnetic flux of the first winding is different from that of the second winding due to the influence of the location of the air gap. A majority of an excitation current flows through the first winding, and a part of the excitation current flowing through the second winding is small. Additional eddy current loss in the third winding generated by induction of the excitation current is small, thereby reducing transformer winding loss. And, an optimal thickness or wire diameter of a copper foil can be selected by the first winding based on the excitation current only, and by the second and third windings based on a load current only, thereby further reducing the transformer winding loss and improving transformer efficiency.

BRIEF DESCRIPTION OF THE DRAWINGS

The accompany drawings are provided for further understanding of the invention, and constitute a part of the specification. The accompany drawings are used to interpret the invention together with the embodiment of the invention, but does not intend to limit the invention. In the accompany drawings.

DETAILED DESCRIPTION OF THE INVENTION

For the purpose of a solution for reducing transformer winding loss, there is provided a transformer according to an embodiment of the invention. The preferred embodiments of the invention will be described hereinafter in conjunction with the accompany drawings. It should be understood that the preferred embodiments described herein are merely for explaining and interpreting the invention, but not for limiting the invention. And, the embodiments and features thereof of the invention can be combined to each other without conflicting.

An embodiment of the invention provides a transformer including an E shaped magnetic core, two I shaped magnetic cores, a first winding, a second winding, and a third winding, wherein:

one of the two I shaped magnetic cores is located between one side leg and a middle leg of the E shaped magnetic core, and constitutes a closed magnetic circuit together with the one side leg, the middle leg, and one bottom leg of the E shaped magnetic core; another of the two I shaped magnetic cores is located between another side leg and the middle leg of the E shaped magnetic core, and constitutes a closed magnetic circuit together with the another side leg, the middle leg, and another bottom leg of the E shaped magnetic core; there is an air gap on each of the two I shaped magnetic cores, two side legs of the E shaped magnetic core, or two bottom legs of the E shaped magnetic core, the first winding is wound on a part of the two I shaped magnetic cores or the E shaped magnetic core where the air gap exists; the second and third windings are wound on the middle leg of the E shaped magnetic core; and the first winding is connected in parallel with the second winding to constitute a primary winding of the transformer; the third winding is a secondary winding of the transformer.

Figure 1:
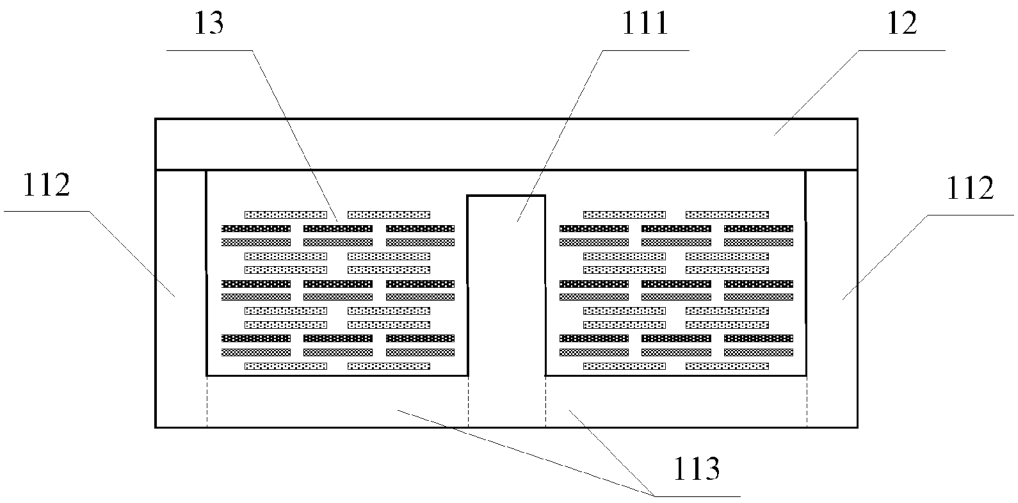
FIG. 1 is a structural diagram of a transformer in the prior art.
Figure 2:
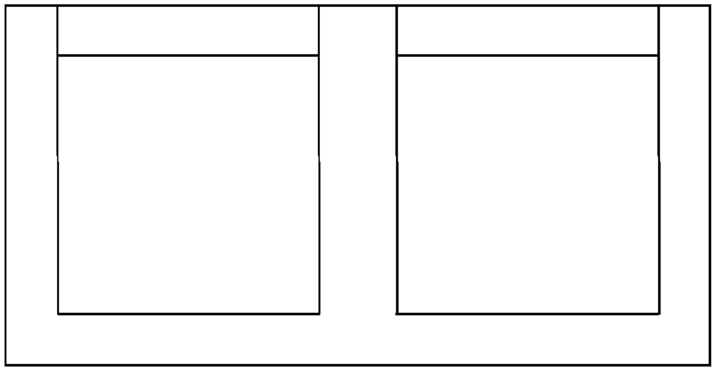
FIG. 2 is a first structural diagram of a transformer magnetic core according to an embodiment of the invention.
Figure 3:
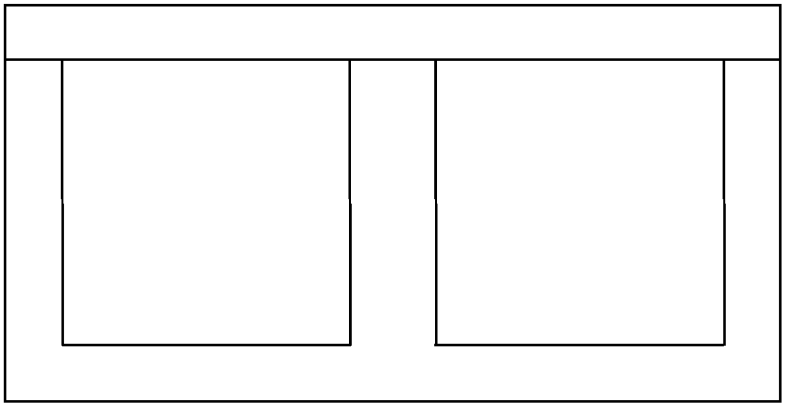
FIG. 3 is a second structural diagram of a transformer magnetic core according to an embodiment of the invention.
Figure 4:
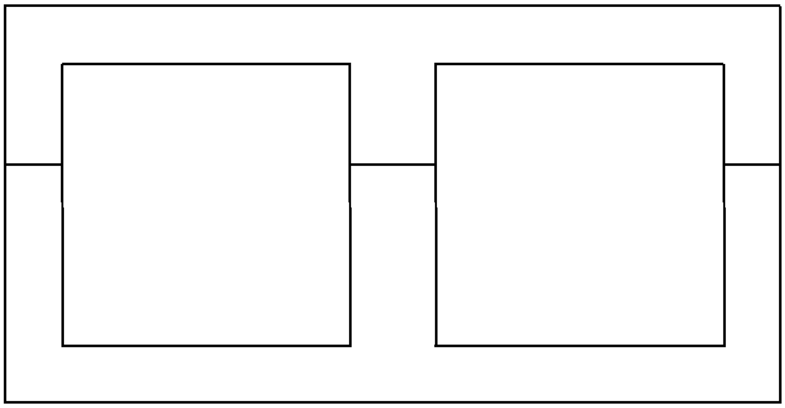
FIG. 4 is a third structural diagram of a transformer magnetic core according to an embodiment of the invention.

In the transformer according to the embodiment of the invention, the manner of constitution of the transformer magnetic core is not limited to that provided in the embodiment. For example, the transformer magnetic core as above may consist of an E shaped magnetic core and two I shaped magnetic cores as shown in FIG. 2, may consist of an E shaped magnetic core and an I shaped magnetic core as shown in FIG. 3, may consist of two E shaped magnetic cores as shown in FIG. 4, may consist of combination of several massive magnetic cores, or the like.

Preferably, a distributed air gap may be adopted to more facilitate to reduce winding loss.

The number of air gaps on each of the two I shaped magnetic cores, the two side legs of the E shaped magnetic core, or the two bottom legs of the E shaped magnetic core may preferably be same, but is not limited thereto.

The air gaps on the two I shaped magnetic cores, the two side legs of the E shaped magnetic core, or the two bottom legs of the E shaped magnetic core may preferably be distributed symmetrically with respect to a center line of the E shaped magnetic core, but is not limited thereto.

The transformer as above will be described in detail through particular embodiments below.

Embodiment 1

Figure 5:
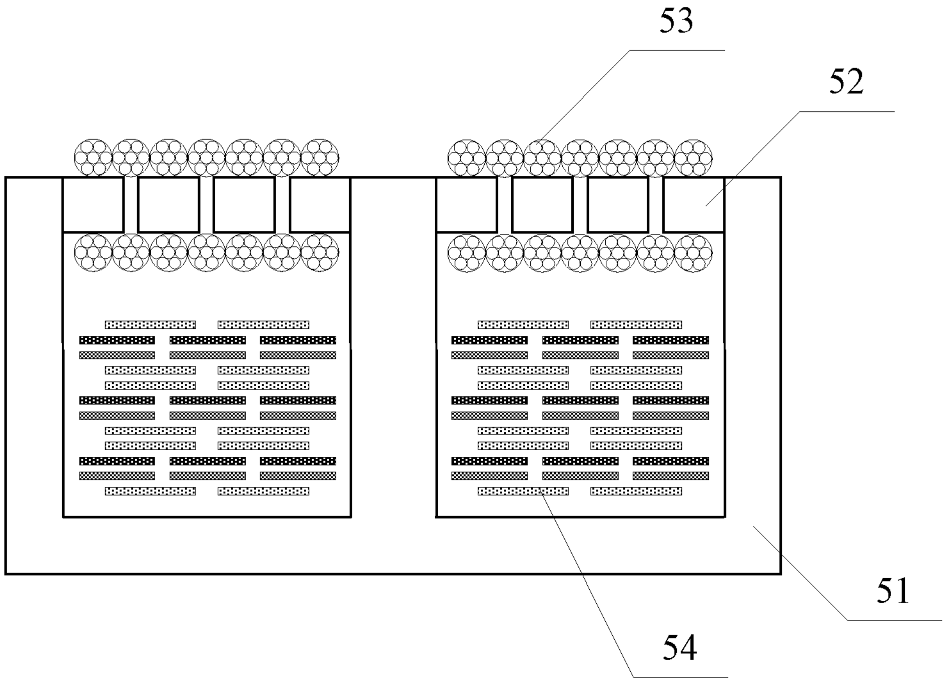
FIG. 5 is a first structural diagram of a transformer according to a first embodiment of the invention.

The transformer according to a first embodiment of the invention is shown in FIG. 5, and includes an E shaped magnetic core 51, two I shaped magnetic cores 52, a first winding 53, a second winding, and a third winding (the second and third windings are collectively denoted as 54 in the figure), wherein:

one of the two I shaped magnetic cores 52 is located between one side leg and a middle leg of the E shaped magnetic core 51, and constitutes a closed magnetic circuit together with the one side leg, the middle leg, and one bottom leg of the E shaped magnetic core 51; another of the two I shaped magnetic cores 52 is located between another side leg and the middle leg of the E shaped magnetic core 51, and constitutes a closed magnetic circuit together with the another side leg, the middle leg, and another bottom leg of the E shaped magnetic core 51; there is an air gap on each of the two I shaped magnetic cores 52, the first winding 53 is wound on a part of the two I shaped magnetic cores 52 where the air gap exists; the second and third windings are wound on the middle leg of the E shaped magnetic core 51; and the first winding 53 is connected in parallel with the second winding to constitute a primary winding of the transformer; the third winding is a secondary winding of the transformer.

And, a distributed air gap is adopted on each of the two I shaped magnetic cores 52, the number of air gaps on each of the two I shaped magnetic cores 52 is same, and the locations thereof are symmetric.

Figure 6:
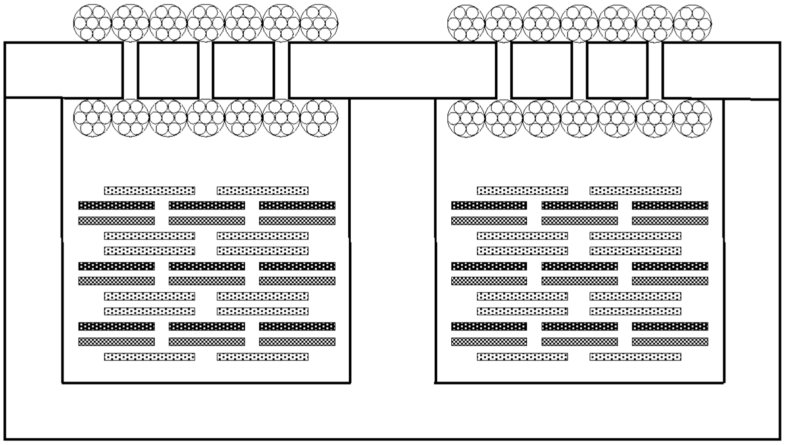
FIG. 6 is a second structural diagram of a transformer according to the first embodiment of the invention.

If the transformer magnetic core in the first embodiment consists of one E shaped magnetic core and one I shaped magnetic core, the structural diagram thereof is shown in FIG. 6, which will not be described in detail herein.

Figure 7:
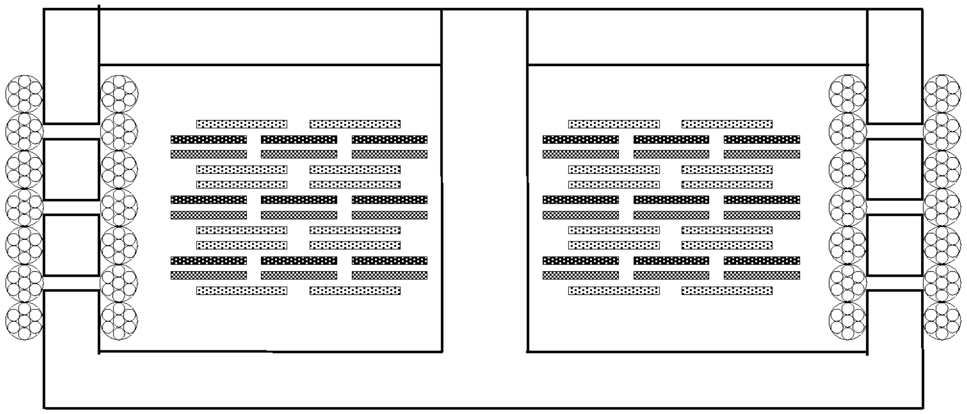
FIG. 7 is a third structural diagram of a transformer according to the first embodiment of the invention.
Figure 8:
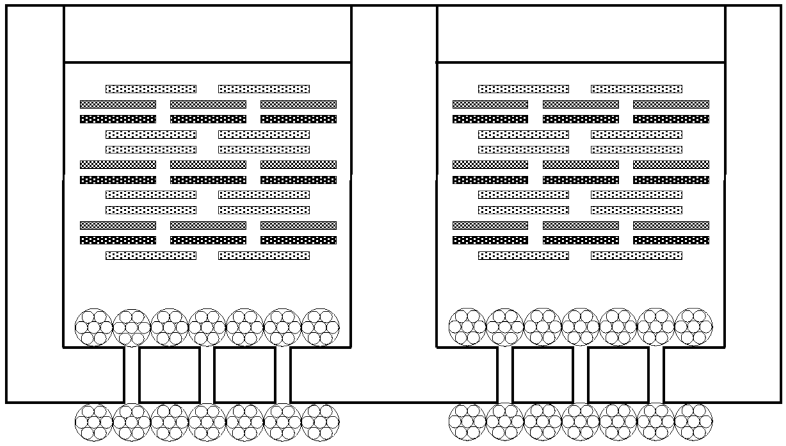
FIG. 8 is a fourth structural diagram of a transformer according to the first embodiment of the invention.

According to the transformer provided by the first embodiment of the invention, the air gap may be located on the two I shaped magnetic cores as shown in FIG. 6, two side legs of the E shaped magnetic core as shown in FIG. 7, or two bottom legs of the E shaped magnetic core as shown in FIG. 8.

Figure 9:
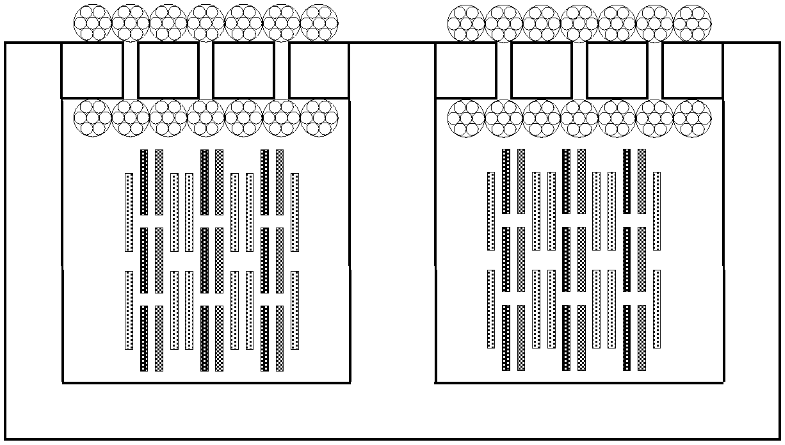
FIG. 9 is a fifth structural diagram of a transformer according to the first embodiment of the invention.

The solution provided by the first embodiment of the invention may be applied to both a planar winding transformer and a vertical winding transformer. The vertical winding transformer to which the solution provided by the first embodiment of the invention is applied is shown in FIG. 9.

With the transformer provided by the first embodiment of the invention, transformer winding loss can be reduced. And, by adopting the distributed air gap, not only air gap fringing flux may be reduced, the peak of the magnetomotive force of the excitation current in the first winding may also be lowered. The thickness of the copper foil of the second and third windings may be optimized based on the magnetomotive force of the load current only without having to consider the influence of the magnetomotive force of the excitation current. Accordingly, a relative thick copper foil may be adopted to further reduce the transformer winding loss and improve the transform efficiency of the transformer.

Based on the transformer provided by the first embodiment above, there is further provided a transformer according to the embodiment of the invention, including a first E shaped magnetic core, a second E shaped magnetic core, an I shaped magnetic core, a first winding, a second winding, and a third winding, wherein:

an opening of the first E shaped magnetic core faces that of the second E shaped magnetic core, the I shaped magnetic core is located between the first E shaped magnetic core and the second E shaped magnetic core so as to form a tesseral magnetic core; there is an air gap on a middle leg, each of two bottom legs, or each of two side legs of the first E shaped magnetic core; the first winding is wound on the first E shaped magnetic core; the second and third windings are wound on a middle leg of the second E shaped magnetic core; and the first winding is connected in parallel with the second winding to constitute a primary winding of the transformer; the third winding is a secondary winding of the transformer.

Preferably, a distributed air gap may be adopted to more facilitate to reduce winding loss.

When the air gap is located on the two bottom legs or the two side legs of the first E shaped magnetic core, the number of air gaps on each of the two bottom legs or each of the two side legs may preferably be same, but is not limited thereto. The air gaps on the two bottom legs or the two side legs may preferably be distributed symmetrically with respect to a center line of the first E shaped magnetic core, but is not limited thereto.

The transformer as above will be described in detail through particular embodiments below.

Embodiment 2

Figure 10:
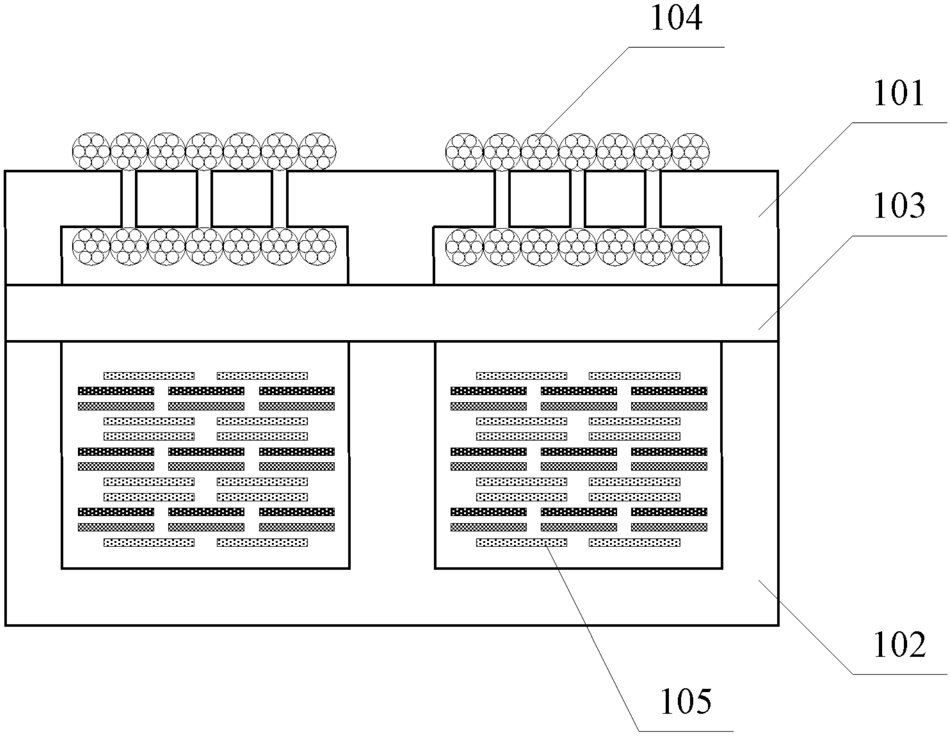
FIG. 10 is a first structural diagram of a transformer according to a second embodiment of the invention.

The transformer according to a second embodiment of the invention is shown in FIG. 10, and includes a first E shaped magnetic core 101, a second E shaped magnetic core 102, an I shaped magnetic core 103, a first winding 104, a second winding, and a third winding (the second and third windings are collectively denoted as 105 in the figure), wherein:

an opening of the first E shaped magnetic core 101 faces that of the second E shaped magnetic core 102, the I shaped magnetic core 103 is located between the first E shaped magnetic core 101 and the second E shaped magnetic core 102 so as to form a tesseral magnetic core; there is an air gap on each of two bottom legs of the first E shaped magnetic core 101; the first winding 104 is wound on a part of the first E shaped magnetic core 101 where the air gap exists; the second and third windings are wound on a middle leg of the second E shaped magnetic core 102; and the first winding 104 is connected in parallel with the second winding to constitute a primary winding of the transformer; the third winding is a secondary winding of the transformer.

And, a distributed air gap is adopted on each of the two bottom legs of the first E shaped magnetic core 101, the number of air gaps on each of the two bottom legs is same, and the locations thereof are symmetric.

Figure 11:
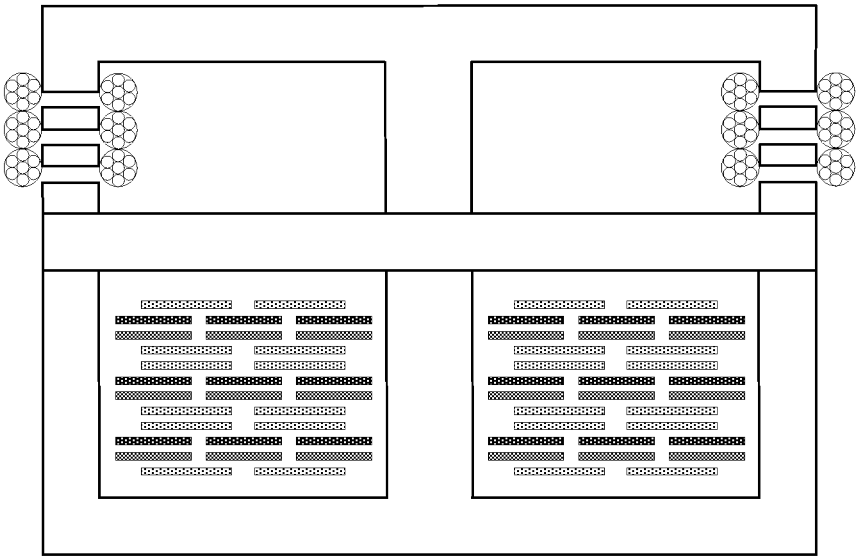
FIG. 11 is a second structural diagram of a transformer according to the second embodiment of the invention.
Figure 12:
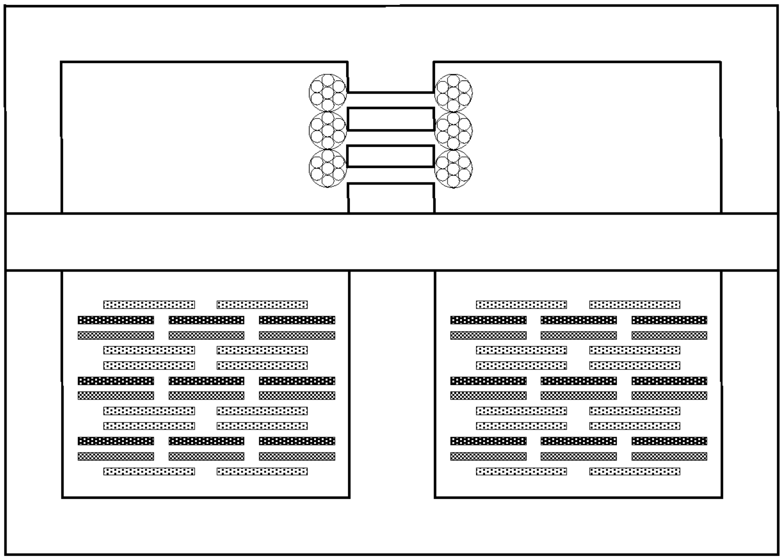
FIG. 12 is a third structural diagram of a transformer according to the second embodiment of the invention.
Figure 13:
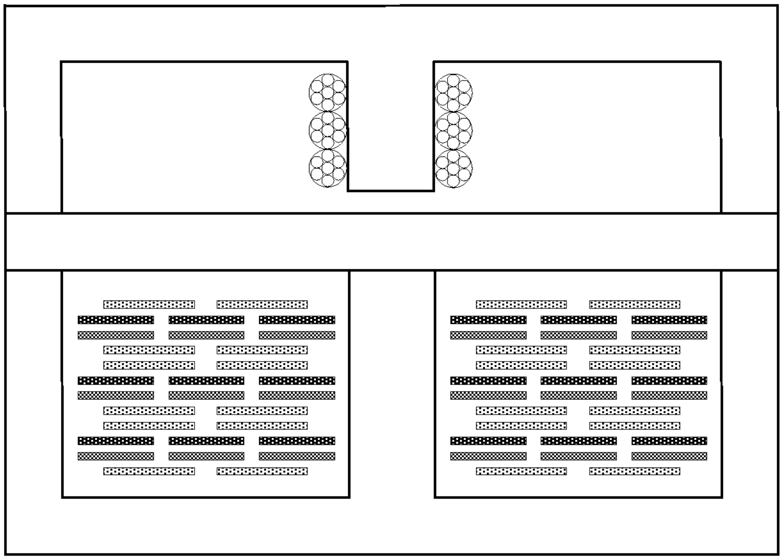
FIG. 13 is a fourth structural diagram of a transformer according to the second embodiment of the invention.

According to the transformer provided by the second embodiment of the invention, the air gap may be located on two bottom legs of the first E shaped magnetic core as shown in FIG. 10, two side legs of the first E shaped magnetic core as shown in FIG. 11, or the middle leg of the first E shaped magnetic core as shown in FIG. 12. And, the first winding may be wound on a part of the first E shaped magnetic core where the air gap exists, or may be wound on a part of the first E shaped magnetic core where the air gap does not exist as shown in FIG. 13.

With the transformer provided by the second embodiment of the invention, in regard to reducing of transformer winding loss, the same technical effect as that brought about by the transformer in the first embodiment can be achieved.

Based on the same concept of the invention, there is further provided a transformer according to the embodiment of the invention, including a U shaped magnetic core, an I shaped magnetic core, a first winding, a second winding, and a third winding, wherein:

the I shaped magnetic core is located between two side legs of the U shaped magnetic core, and constitutes a closed magnetic circuit together with the U shaped magnetic core; there is an air gap on the I shaped magnetic core or a bottom leg of the U shaped magnetic core, the first winding is wound on a part of the I shaped magnetic core or the U shaped magnetic core where the air gap exists; the second and third windings are wound on the two side legs of the U shaped magnetic core; and the first winding is connected in parallel with the second winding to constitute a primary winding of the transformer; the third winding is a secondary winding of the transformer.

Figure 14:
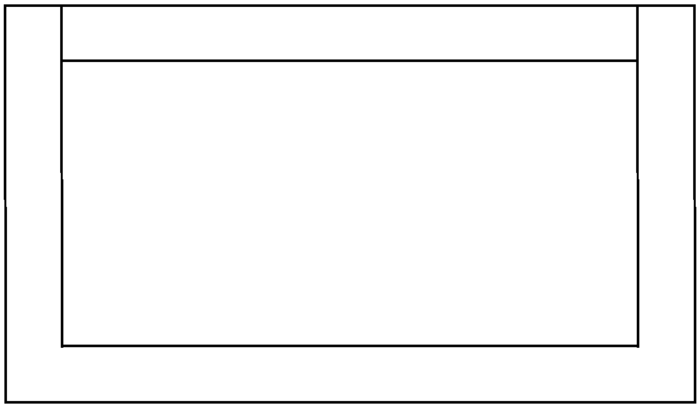
FIG. 14 is a fourth structural diagram of a transformer magnetic core according to an embodiment of the invention.
Figure 15:
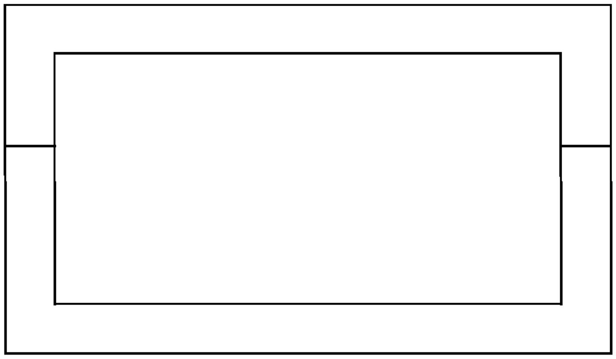
FIG. 15 is a fifth structural diagram of a transformer magnetic core according to an embodiment of the invention.

In the transformer according to the embodiment of the invention, the manner of constitution of the transformer magnetic core is not limited to that provided in the embodiment. For example, the transformer magnetic core as above may consist of one U shaped magnetic core and one I shaped magnetic core as shown in FIG. 14, may consist of two U shaped magnetic cores as shown in FIG. 15, may consist of combination of several massive magnetic cores, or the like.

Preferably, a distributed air gap may be adopted to more facilitate to reduce winding loss.

The air gaps on the I shaped magnetic core or the bottom leg of the U shaped magnetic core may preferably be distributed symmetrically with respect to a center line of the U shaped magnetic core, but is not limited thereto.

The transformer as above will be described in detail through particular embodiments below.

Embodiment 3

Figure 16:
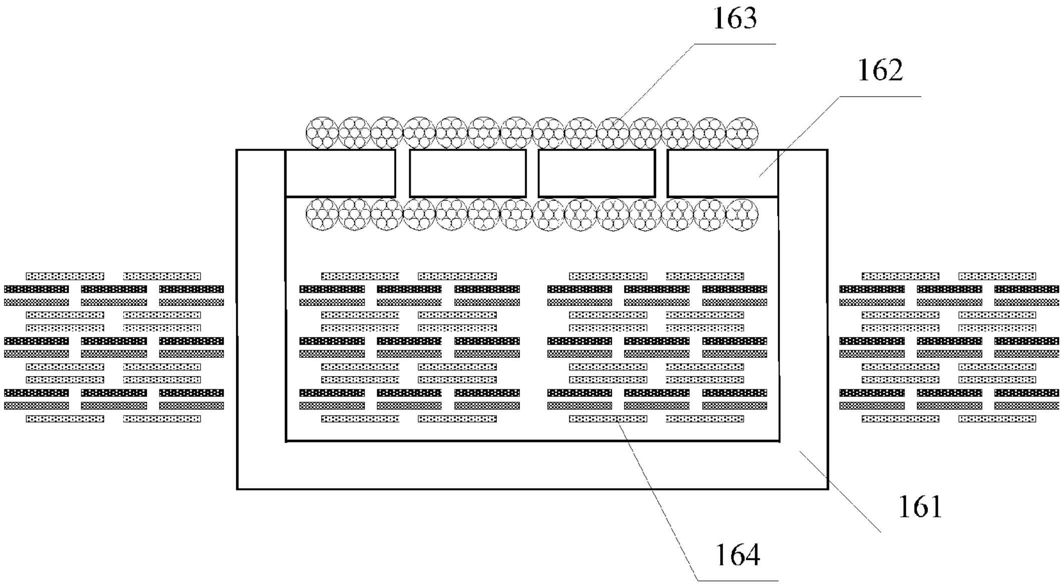
FIG. 16 is a first structural diagram of a transformer according to a third embodiment of the invention.

The transformer according to a third embodiment of the invention is shown in FIG. 16, and includes a U shaped magnetic core 161, an I shaped magnetic core 162, a first winding 163, a second winding, and a third winding (the second and third windings are collectively denoted as 164 in the figure), wherein:

the I shaped magnetic core 162 is located between two side legs of the U shaped magnetic core 161, and constitutes a closed magnetic circuit together with the U shaped magnetic core 161; there is an air gap on the I shaped magnetic core 162, the first winding 163 is wound on a part of the I shaped magnetic core 162 where the air gap exists; the second and third windings are wound on the two side legs of the U shaped magnetic core 161; and the first winding 163 is connected in parallel with the second winding to constitute a primary winding of the transformer; the third winding is a secondary winding of the transformer.

And, a distributed air gap is adopted on the I shaped magnetic core 162, and the air gaps are distributed symmetrically with respect to a center line of the U shaped magnetic core 161.

Figure 17:
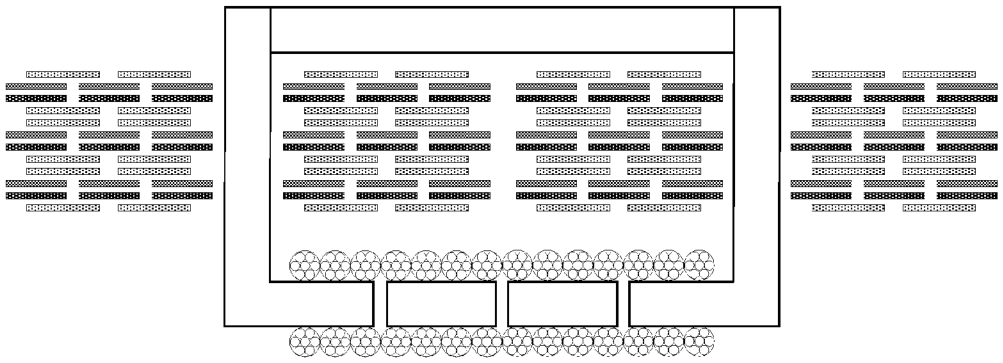
FIG. 17 is a second structural diagram of a transformer according to the third embodiment of the invention.

According to the transformer provided by the third embodiment of the invention, the air gap may be located on the I shaped magnetic core as shown in FIG. 16, or a bottom leg of the U shaped magnetic core as shown in FIG. 17.

With the transformer provided by the third embodiment of the invention, transformer winding loss can be reduced, and the transform efficiency of the transformer can be improved.

Based on the transformer provided by the third embodiment above, there is further provided a transformer according to the embodiment of the invention, including a first U shaped magnetic core, a second U shaped magnetic core, an I shaped magnetic core, a first winding, a second winding, and a third winding, wherein:

an opening of the first U shaped magnetic core faces that of the second U shaped magnetic core, the I shaped magnetic core is located between the first U shaped magnetic core and the second U shaped magnetic core so as to form a B shaped magnetic core; there is an air gap on a bottom leg or each of two side legs of the first U shaped magnetic core; the first winding is wound on the first U shaped magnetic core; the second and third windings are wound on two side legs of the second U shaped magnetic core; and the first winding is connected in parallel with the second winding to constitute a primary winding of the transformer; the third winding is a secondary winding of the transformer.

Preferably, a distributed air gap may be adopted to more facilitate to reduce winding loss.

When the air gap is located on the bottom leg of the first U shaped magnetic core, the air gaps may preferably be distributed symmetrically with respect to a center line of the first U shaped magnetic core, but is not limited thereto.

When the air gap is located on the two side legs of the first U shaped magnetic core, the number of air gaps on each of the two side legs may preferably be same, but is not limited thereto. The air gaps on the two side legs may preferably be distributed symmetrically with respect to a center line of the first U shaped magnetic core, but is not limited thereto.

The transformer as above will be described in detail through particular embodiments below.

Embodiment 4

Figure 18:
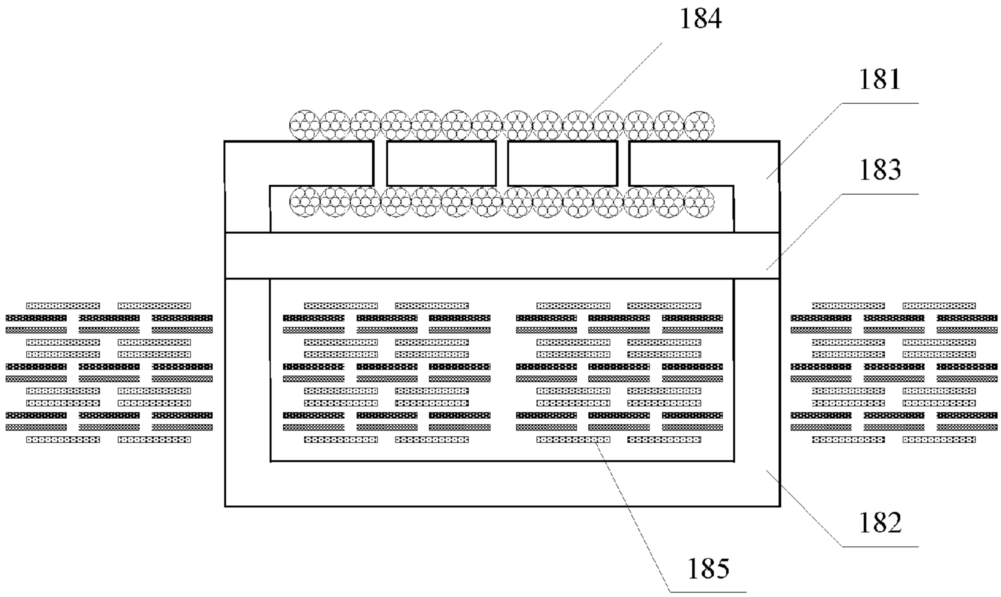
FIG. 18 is a first structural diagram of a transformer according to a fourth embodiment of the invention.

The transformer according to a fourth embodiment of the invention is shown in FIG. 18, and includes a first U shaped magnetic core 181, a second U shaped magnetic core 182, an I shaped magnetic core 183, a first winding 184, a second winding, and a third winding (the second and third windings are collectively denoted as 185 in the figure), wherein:

an opening of the first U shaped magnetic core 181 faces that of the second U shaped magnetic core 182, the I shaped magnetic core 183 is located between the first U shaped magnetic core 181 and the second U shaped magnetic core 182 so as to form a B shaped magnetic core; there is an air gap on a bottom leg of the first U shaped magnetic core 181; the first winding 184 is wound on a part of the first U shaped magnetic core 181 where the air gap exists; the second and third windings are wound on two side legs of the second U shaped magnetic core; and the first winding 184 is connected in parallel with the second winding to constitute a primary winding of the transformer; the third winding is a secondary winding of the transformer.

And, a distributed air gap is adopted on the first U shaped magnetic core 181, and the air gaps are distributed symmetrically with respect to a center line of the first U shaped magnetic core.

Figure 19:
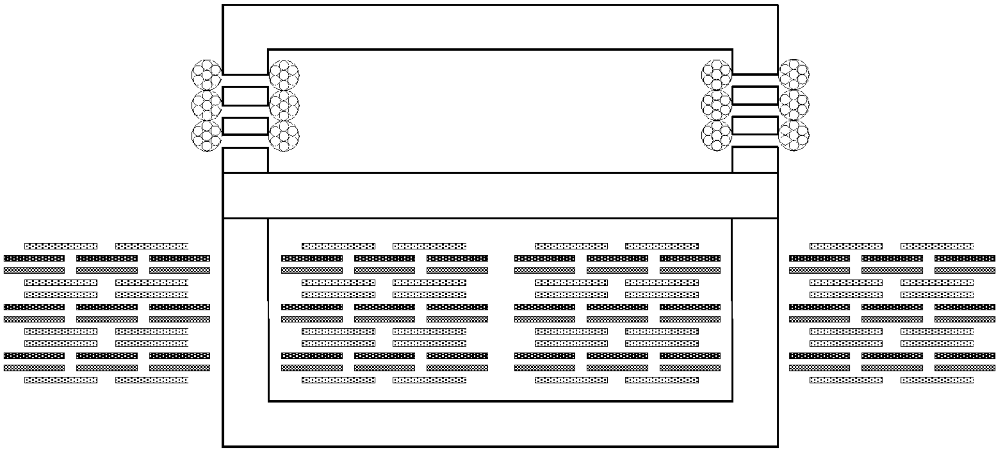
FIG. 19 is a second structural diagram of a transformer according to the fourth embodiment of the invention.
Figure 20:
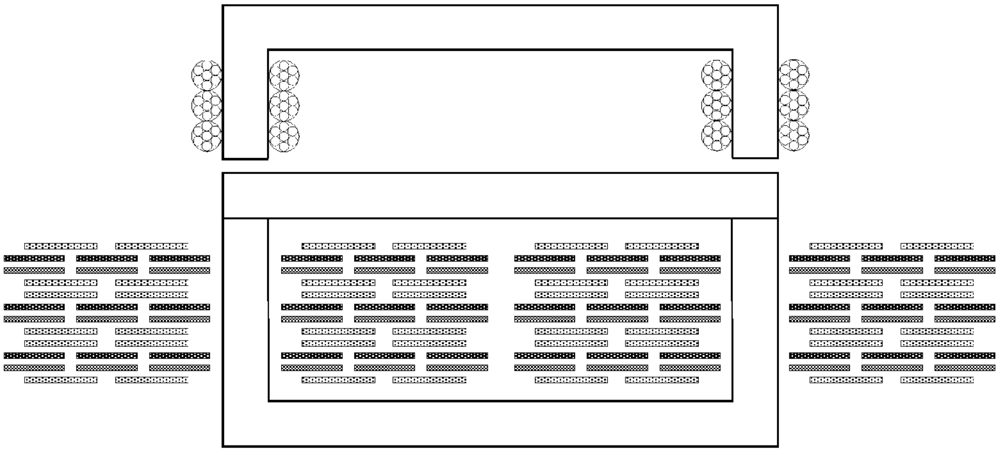
FIG. 20 is a third structural diagram of a transformer according to the fourth embodiment of the invention.

According to the transformer provided by the fourth embodiment of the invention, the air gap may be located on the bottom leg of the first U shaped magnetic core as shown in FIG. 18, or two side legs of the first U shaped magnetic core as shown in FIG. 19. And, the first winding may be wound on a part of the first U shaped magnetic core where the air gap exists, or may be wound on a part of the first U shaped magnetic core where the air gap does not exist as shown in FIG. 20.

With the transformer provided by the fourth embodiment of the invention, in regard to reducing of transformer winding loss, the same technical effect as that brought about by the transformer in the third embodiment can be achieved.

In summary, the transformer provided by the embodiment of the invention includes an E shaped magnetic core, two I shaped magnetic cores, a first winding, a second winding, and a third winding, wherein: one of the two I shaped magnetic cores is located between one side leg and a middle leg of the E shaped magnetic core, and constitutes a closed magnetic circuit together with the one side leg, the middle leg, and one bottom leg of the E shaped magnetic core; another of the two I shaped magnetic cores is located between another side leg and the middle leg of the E shaped magnetic core, and constitutes a closed magnetic circuit together with the another side leg, the middle leg, and another bottom leg of the E shaped magnetic core; there is an air gap on each of the two I shaped magnetic cores, two side legs of the E shaped magnetic core, or two bottom legs of the E shaped magnetic core, the first winding is wound on a part of the two I shaped magnetic cores or the E shaped magnetic core where the air gap exists; the second and third windings are wound on the middle leg of the E shaped magnetic core; and the first winding is connected in parallel with the second winding to constitute a primary winding of the transformer; the third winding is a secondary winding of the transformer. With the transformer provided by the embodiment of the invention, transformer winding loss can be reduced, and the transformer efficiency can be improved.

Obviously, those skilled in the art may make various modifications and alterations to the invention without departing from the spirit and scope of the invention. Thus, if such modifications and alterations to the invention are within the scope of the Claims of the invention and the equivalents thereof, the invention intends to contain such modifications and alterations.

The invention claimed is:

1. A transformer characterized by comprising an E shaped magnetic core, two I shaped magnetic cores, a first winding, a second winding, and a third winding, wherein:

one of the two I shaped magnetic cores is located between one side leg and a middle leg of the E shaped magnetic core, and constitutes a closed magnetic circuit together with the one side leg, the middle leg, and one bottom leg of the E shaped magnetic core; another of the two I shaped magnetic cores is located between another side leg and the middle leg of the E shaped magnetic core, and constitutes a closed magnetic circuit together with the another side leg, the middle leg, and another bottom leg of the E shaped magnetic core;

there is an air gap on each of the two I shaped magnetic cores, two side legs of the E shaped magnetic core, or two bottom legs of the E shaped magnetic core, the first winding is wound on a part of the two I shaped magnetic cores or the E shaped magnetic core where the air gap exists; the second and third windings are wound on the middle leg of the E shaped magnetic core; and the first winding is connected in parallel with the second winding to constitute a primary winding of the transformer; the third winding is a secondary winding of the transformer.

2. The transformer according to claim 1, characterized in that the air gap is a distributed air gap.

3. The transformer according to claim 2, characterized in that the number of air gaps on each of the two I shaped magnetic cores, the two side legs of the E shaped magnetic core, or the two bottom legs of the E shaped magnetic core is same.

4. The transformer according to claim 3, characterized in that the air gaps on the two I shaped magnetic cores, the two side legs of the E shaped magnetic core, or the two bottom legs of the E shaped magnetic core are distributed symmetrically with respect to a center line of the E shaped magnetic core.

* * * * *